US009597936B2

(12) United States Patent
Harrison

(10) Patent No.: US 9,597,936 B2
(45) Date of Patent: Mar. 21, 2017

(54) HITCH MOUNTABLE CARGO CARRIER

(71) Applicant: Craig Harrison, Gulf Breeze, FL (US)

(72) Inventor: Craig Harrison, Gulf Breeze, FL (US)

( * ) Notice: Subject to any disclaimer, the term of this patent is extended or adjusted under 35 U.S.C. 154(b) by 155 days.

(21) Appl. No.: 14/602,849

(22) Filed: Jan. 22, 2015

(65) Prior Publication Data

US 2016/0214451 A1    Jul. 28, 2016

(51) Int. Cl.
*B60R 9/00* (2006.01)
*B60D 1/58* (2006.01)
*B60R 9/06* (2006.01)

(52) U.S. Cl.
CPC . *B60D 1/58* (2013.01); *B60R 9/06* (2013.01)

(58) Field of Classification Search
CPC  B60R 9/06; B60R 9/065; B60R 11/06; B60R 9/00; B60R 9/08; B60R 2011/004
USPC ................................. 224/498, 499, 519, 522
See application file for complete search history.

(56) References Cited

U.S. PATENT DOCUMENTS

| | | | | |
|---|---|---|---|---|
| 1,513,608 A | * | 10/1924 | Labombarde | B65D 5/2047 229/104 |
| 3,322,299 A | * | 5/1967 | Foster | B65D 43/021 220/789 |
| 3,464,582 A | * | 9/1969 | Greitzer | B65D 43/0212 220/786 |
| 4,967,944 A | * | 11/1990 | Waters | B60R 11/06 224/404 |
| 5,586,702 A | * | 12/1996 | Sadler | B60R 9/06 224/281 |
| 5,911,346 A | * | 6/1999 | Onken | B65D 25/38 220/DIG. 5 |
| 6,099,035 A | * | 8/2000 | Garvin, III | B60R 9/06 224/486 |
| 8,151,616 B2 | * | 4/2012 | Isomaki | B21D 5/01 220/606 |
| 9,107,243 B2 | * | 8/2015 | Fitzwater | A47J 36/027 |
| 2005/0092800 A1 | * | 5/2005 | Wilson | B60R 9/08 224/513 |
| 2009/0056592 A1 | * | 3/2009 | Threet | B60R 9/06 108/11 |

* cited by examiner

*Primary Examiner* — Adam Waggenspack
(74) *Attorney, Agent, or Firm* — GrayRobinson, P.A.; Thomas L. Kautz

(57) ABSTRACT

A carrier is provided for attachment to the trailer hitch of a vehicle which is light-weight, easy to manufacture and includes a tray that may be fabricated in one-piece from a single sheet of material.

5 Claims, 4 Drawing Sheets

HITCH MOUNTABLE CARGO CARRIER

FIELD OF THE INVENTION

This invention relates to carriers, and, more particularly, to a carrier for attachment to the trailer hitch of a vehicle.

BACKGROUND OF THE INVENTION

Pickup trucks and many sports utility vehicles are equipped with a trailer hitch typically employed to receive a hitch ball which may be connected to a trailer for towing. In recent years, external carriers have become popular to provide additional transport capacity especially for vehicles that do not have a luggage rack on the roof. These external carriers include a four-sided platform connected to a mounting tube which may be inserted into and secured within the hitch of a vehicle. The platform is configured to support luggage, coolers and similar items, or game in hunting applications, such that the items are readily accessible at the back of the vehicle and at the level of the hitch rather than on vehicle roof.

Most carriers of the type described above comprise opposed side walls and opposed end walls which are connected at the ends by welding. A bottom wall, which may be in the form of wire mesh or a solid plate, is welded or otherwise secured to the side walls and end walls to form the platform of the carrier. The mounting tube is welded at the base of the bottom wall with one end protruding from the platform for insertion into the hitch. Carriers of this type are bulky, unattractive and relatively expensive to manufacture in view of the number of welds needed to connect the walls and mounting tube together.

SUMMARY OF THE INVENTION

This invention is directed to a carrier for attachment to the trailer hitch of a vehicle which is light-weight, easy to manufacture and includes a tray that preferably may be fabricated in one-piece.

In the presently preferred embodiment, the carrier of this invention is fabricated from a single sheet of material such as aluminum. The sheet undergoes a series of bending operations that result in the formation of opposed side walls, opposed end walls and a bottom wall which collectively define a tray having a compartment for the transport of various items. A reinforcing beam is integrally formed with each of the side walls to add structural rigidity to the carrier. A mounting tube is connected to the bottom wall, opposite the compartment, which may be inserted into and secured within the hitch of a vehicle.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE PREFERRED EMBODIMENT

Figure 1:
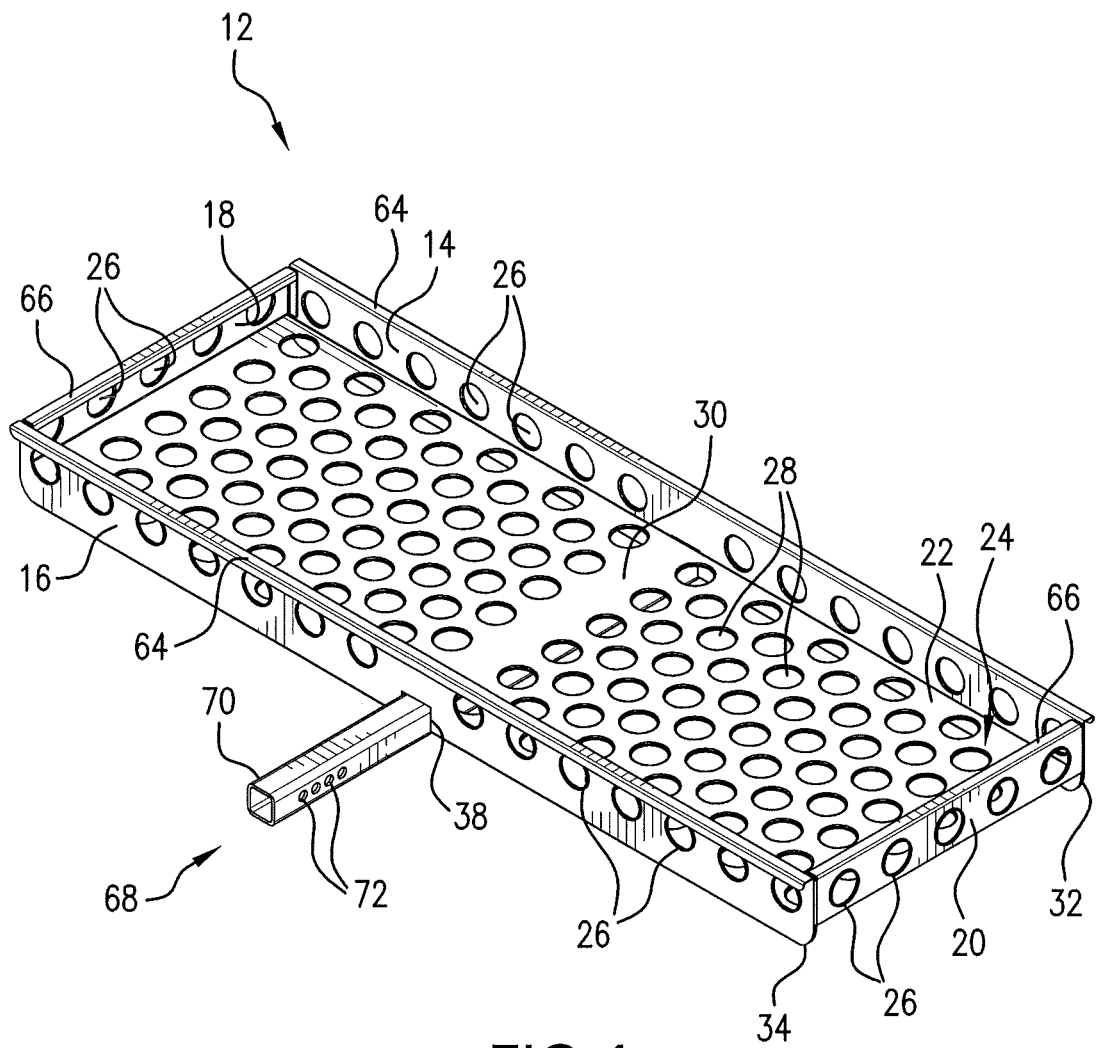
FIG. 1 is a perspective view of the carrier of this invention.

Referring to the drawings, the carrier 10 of this invention comprises a one-piece tray 12 having opposed side walls 14 and 16, opposed end walls 18 and 20, and, a bottom wall 22 which collectively define a compartment 24. As best seen in FIG. 1, each of the side walls 14, 16 and end walls 18, 20 of the tray 12 extend upwardly from the bottom wall 22 so that the compartment 24 is essentially closed except for an open top. That portion of each of the side walls 14, 16 and end walls 18, 20 located above the bottom wall 22 is preferably formed with a number of spaced tie-down openings 26, and the bottom wall 22 is formed with a pattern of tie-down openings 28 except for a center section 30, for purposes discussed below. A reinforcing beam 32 is integrally formed with the side wall 14, and a second reinforcing beam 34 is integrally formed with the side wall 16. Both of the reinforcing beams 32, 34 project downwardly from the bottom wall 22. For purposes of the present discussion, the terms "upwardly," "downwardly," "top," "bottom," "inwardly" and "outwardly" refer to the orientation of the carrier 10 as depicted in the Figs.

Figure 4:
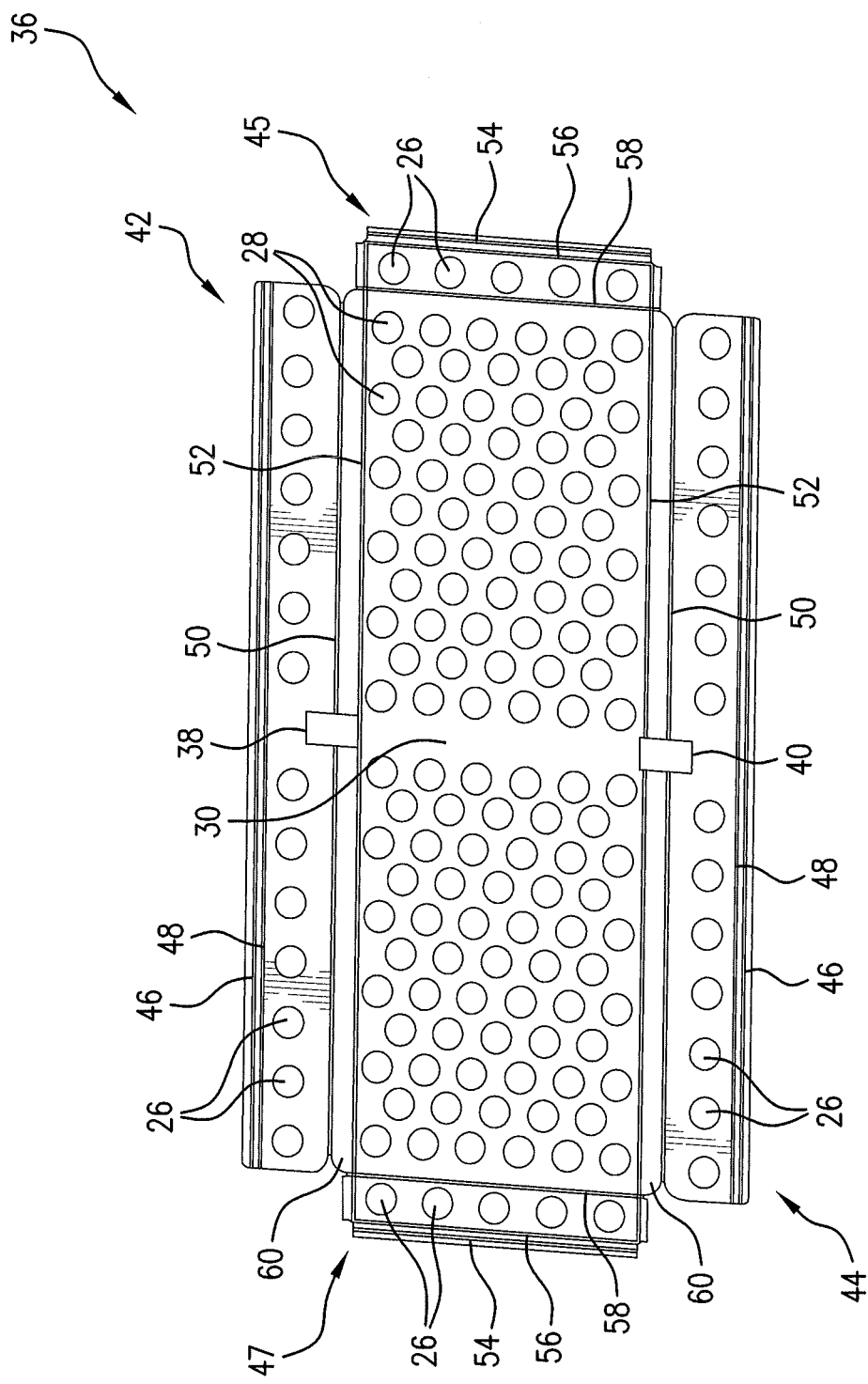
FIG. 4 is a plan view of a sheet of material which undergoes bending operations to form the tray of the carrier of this invention.

An important aspect of this invention is that in one preferred embodiment the tray 12 of the carrier 10 may be fabricated in a series of bending operations that significantly reduces labor costs while producing a rigid structure. As depicted in FIG. 4, the tray 12 may be formed from a single blank or sheet 36 that is punched to form the openings 26, 28 noted above, two notches 38 and 40 described below, and open areas at the four corners. After undergoing the punching operation, the sheet 36 has a side panel 42, a side panel 44, an end panel 45, an end panel 47 and what will become the bottom wall 22 after bending.

The side panel 42 has spaced fold lines 46 and 48 located outwardly from the tie-down openings 26, and spaced fold lines 50, 52 inwardly from such openings 26. The side panel 44 has the same construction. Each end panel 45 and 47 has spaced fold lines 54, 56 located outwardly from the tie-down openings 26, and a fold line 58 at the juncture of such end panels 45, 47 with the bottom wall 22.

Figure 2:
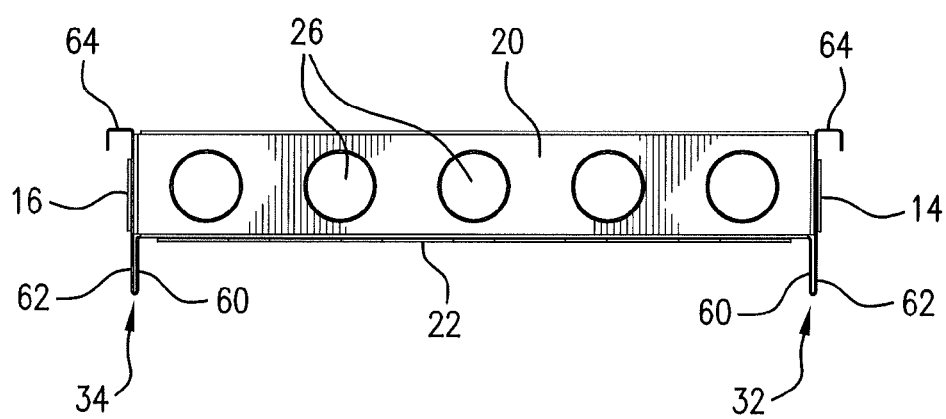
FIG. 2 is an end view of the carrier shown in FIG. 1.

Referring to FIGS. 2 and 4, the side panel 42 is bent along the fold line 52 to form a side edge of the bottom wall 22. The side panel 42 is folded over on itself, along the fold line 50, to form both the reinforcing beam 32 and the side wall 14. As best seen in FIG. 2, the reinforcing beam 32 comprises that portion 60 of the side panel 42 between fold lines 50 and 52 and a lower portion 62 of side panel 42 which extends below the bottom wall 22. As such, the portions 60 and 62 of side panel 42 are essentially doubled up against one another in the folding operation to form the reinforcing beam 32, which adds overall rigidity and stability to the carrier 10. The side wall 14 of tray 12 comprises that portion of the side panel 42 which extends upwardly from the bottom wall 22 after the bending operation is completed. The side wall 14 is then bent at fold lines 46 and 48 to form an inverted U-shaped lip 64 so that the top edge of the side wall 14 is smooth and does not present a sharp edge for one handling and using the carrier 10. The side panel 44 undergoes the same bending operation as side panel 42, described above, to form the reinforcing beam 34, side wall 16 and a lip 64 at the top of side wall 16. Each end panel 45 and 47 is bent along the fold line 58 to form opposed end edges of the bottom wall 22 and respective end walls 18, 20 which extend upwardly relative to the bottom wall 22. An inverted U-shaped lip 66 is formed at the top of each end wall 18, 20 by a bending operation along fold lines 56 and 58.

Once the bending operations described above are completed, the side walls 14, 16 and end walls 18, 20 are oriented generally perpendicularly to the bottom wall 22 and in abutment with one another at their ends. The ends of side walls 16, 18 may be connected to respective ends of end walls 18, 20 by tack welding, fasteners or any other suitable means. This forms the completed tray 12 of carrier 10 having compartment 24 with a depth equal to the height of walls 14-20, as measured from the bottom wall 22 to the lips 64 of side walls 14, 16 and to the lips 66 of end walls 18, 20. Luggage, boxes, coolers and other items may be placed in the compartment 24 and secured by bungee cords, rope or the like connected to any one of the tie-down openings 26 and 28.

Figure 3:
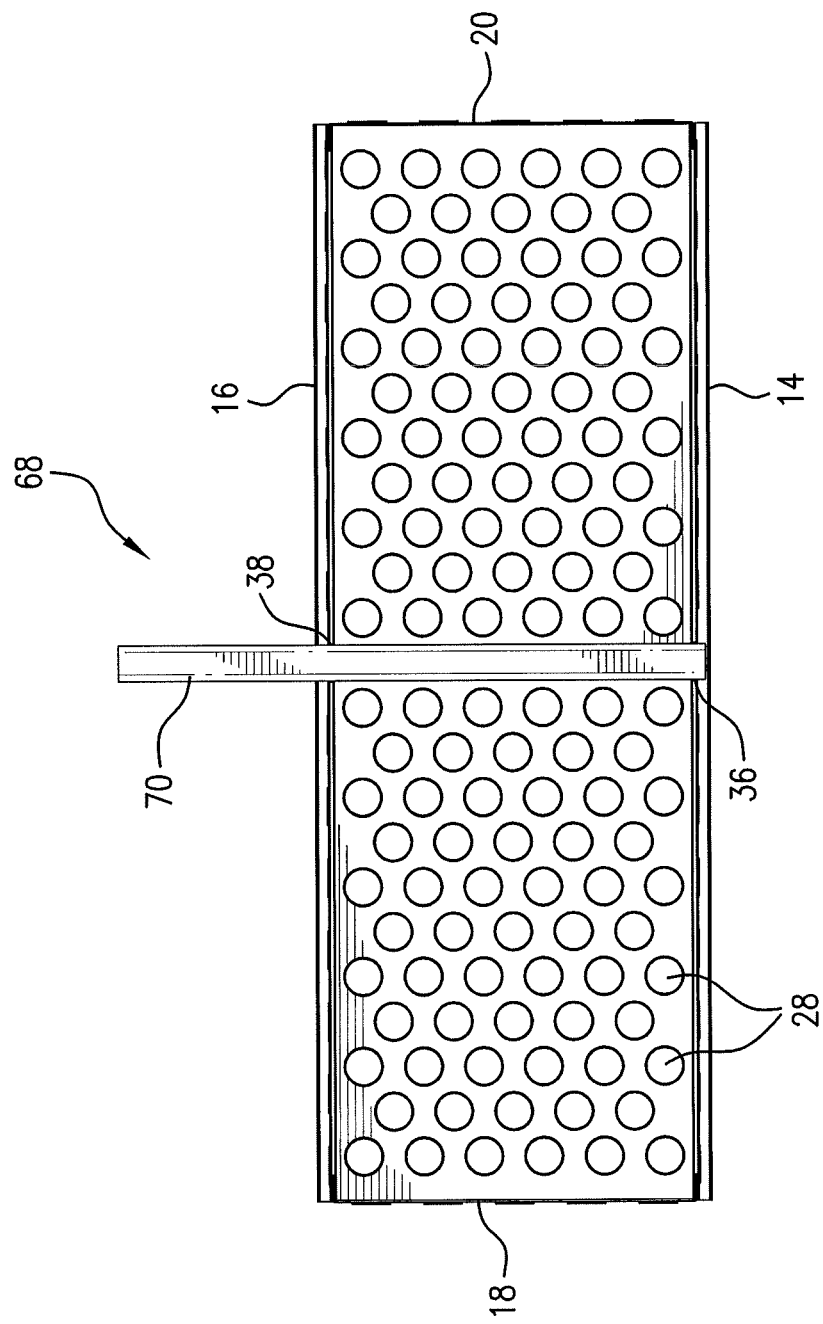
FIG. 3 is a bottom view of the carrier herein.

In the presently preferred embodiment, the carrier 10 further includes a mounting tube 68. As best seen in FIGS. 1 and 3, the mounting tube 68 is positioned along the center section 30 of the bottom wall 22, opposite the compartment 24, where it is received within the notches 36 and 38. The notches 36 and 38 are formed at least partially within both the portions 60 and 62 of respective side panels 42, 44, so that the mounting tube 68 contacts the reinforcing beams 32, 34 and the center section 30 of the bottom wall 22. In this position, the mounting tube 68 may be connected by welding, fasteners or otherwise secured to the bottom wall 22. Preferably, one end 70 of the mounting tube 68 projects from the side wall 16 of carrier 10 for insertion into the hitch of a vehicle. Such end 70 may be formed with spaced bores 72 to receive a pin (not shown) in order to secure the mounting tube 68 within the hitch.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. For example, while the tray 12 of this invention is described above as being formed from aluminum of similar material, it is contemplated that in an alternative embodiment such tray may be fabricated from plastic or composite material in a bending or molding operation.

Therefore, it is intended that the invention not be limited to the particular embodiment disclosed as the best mode contemplated for carrying out this invention, but that the invention will include all embodiments falling within the scope of the appended claims.

What is claimed is:

1. A carrier for transporting items using the hitch receiver of a vehicle, comprising:
   a one-piece tray including a bottom wall, a first side panel, a second side panel, a first end wall and a second end wall;
   each of said first and second end walls extending upwardly from said bottom wall and having opposed end edges, a first bend being formed between said first end wall and said bottom wall and a second bend being formed between said second end wall and said bottom wall;
   each of said first and second side panels comprising:
   (i) an upper portion extending upwardly relative to said bottom wall to define respective first and second side walls each having opposed end edges;
   (ii) a lower portion including an inner section extending downwardly from said bottom wall, a third bend being formed between said bottom wall and said inner section, a discrete outer section extending vertically alongside said inner section, a fourth bend being formed between said inner section and said outer section, said outer section being formed in one-piece with a respective one of said first and second side walls;
   (iii) said inner and outer sections of each of said first and second side panels collectively defining respective first and second reinforcing beams which extend downwardly relative to said bottom wall;
   said opposed end edges of each of said first and second side walls abutting an end edge of said first and second end walls and being fixed thereto, said first and second side walls and said first and second end walls collectively forming a compartment of said one-piece tray;
   a first notch formed in said first reinforcing beam and a second notch formed in said second reinforcing beam which aligns with said first notch;
   a mounting tube connected to said bottom wall opposite said compartment and extending between said first and second notches, said mounting tube having an end which protrudes from one of said first and second reinforcing beams in position to be secured within the hitch receiver of a vehicle.

2. The carrier of claim 1 in which each of said first and second side walls, said first and second end walls and said bottom wall is formed with openings.

3. The carrier of claim 2 in which each of said openings formed in said first and second side walls and in said first and second end walls extends into said compartment.

4. The carrier of claim 1 in which said bottom wall is formed with a center section without openings, said mounting tube being connected to said center section of said bottom wall opposite said compartment.

5. The carrier of claim 1 in which each of said first and second side walls and said first and second end walls is formed with a lip at an outer edge thereof.

* * * * *